United States Patent [19]
Pfleiderer et al.

[11] 4,358,786
[45] Nov. 9, 1982

[54] METHOD AND A CIRCUIT ARRANGEMENT FOR THE STORAGE OF VIDEO SIGNALS

[75] Inventors: Hans-Joerg Pfleiderer, Zorneding; Karl-Ulrich Stein, Munich; Michael Koubek, Munich; Hans-Martin Christiansen, Munich, all of Fed. Rep. of Germany

[73] Assignee: Siemens Aktiengesellschaft, Berlin & Munich, Fed. Rep. of Germany

[21] Appl. No.: 57,128

[22] Filed: Jul. 11, 1979

[30] Foreign Application Priority Data

Aug. 10, 1978 [DE] Fed. Rep. of Germany ....... 2835130

[51] Int. Cl.³ .............................................. H04N 5/79
[52] U.S. Cl. .................................... 358/310; 358/335; 360/22; 360/33.1
[58] Field of Search .................... 358/4, 9, 127, 133; 360/9, 22, 23, 33; 307/221 C, 221 D; 328/37, 105, 153; 365/183, 222, 219, 220, 221, 233

[56] References Cited

U.S. PATENT DOCUMENTS

| | | | |
|---|---|---|---|
| 3,234,323 | 2/1966 | Kihara | 360/33 X |
| 3,763,480 | 10/1973 | Weimer | 365/183 X |
| 3,806,640 | 4/1974 | Furukawa | 360/23 |
| 3,855,424 | 12/1974 | Tharmaratnam et al. | 360/9 X |
| 3,975,764 | 8/1976 | Kobayashi et al. | 360/33 X |
| 4,024,512 | 5/1977 | Amelio et al. | 365/183 |
| 4,074,307 | 2/1978 | Dischert et al. | 360/36 X |
| 4,133,009 | 1/1979 | Kittler et al. | 360/36 X |

FOREIGN PATENT DOCUMENTS 2708672 8/1978 Fed. Rep. of Germany.

Primary Examiner—Stuart N. Hecker
Attorney, Agent, or Firm—Hill, Van Santen, Steadman, Chiara & Simpson

[57] ABSTRACT

Video signals are stored on a continuously movable magnetic tape with a dissection of the video signals into a plurality of partial signals and simultaneously recording the partial signals in a plurality of longitudinal tracks which extend parallel to one another. Inasmuch as mutual influences of the individual image formation to be stored are to be reduced, even given a great recording density, the signal lines of the video signal are employed as partial signals, whereby the line signals belonging to a television image are combined to at least one group and are successively recorded in groups. All line signals belonging to one and the same group are simultaneously recorded on a plurality of longitudinal tracks after an intermediate storage. The invention finds particular application in video recorders having longitudinal track recording.

12 Claims, 10 Drawing Figures

METHOD AND A CIRCUIT ARRANGEMENT FOR THE STORAGE OF VIDEO SIGNALS

BACKGROUND OF THE INVENTION

1. Field of the Invention

The present invention relates to a method and to a circuit arrangement for storing video signals on a continuously movable magnetic recording tape with a dissection of the video signal into a plurality of partial signals and a simultaneous recording of the partial signals in a plurality of longitudinal tracks which extend parallel to one another.

2. Description of the Prior Art

Techniques of the type generally set forth above are proposed in the German patent application No. P 27 08 672.2, in which the video signal to be stored is dissected into a plurality of partial signals of smaller bandwidth. The individual partial signals are obtained either by means of the dissection of the video signal into partial frequency bands which are adjacent one another and which are defined by means of band pass filters, or by means of a periodic scanning of the video signal.

SUMMARY OF THE INVENTION

The object of the present invention is to provide a method and apparatus, improved from the type generally set forth above, in which the mutual influences of the individual information to be stored are reduced to a small proportion, even given a great recording density.

The foregoing object is achieved in that the line signals belonging to a television image are combined into at least one group and are recorded group-wise in succession, in that all line signals respectively belonging to one and the same group are simultaneously recorded on longitudinal tracks individually assigned thereto after an intermediate storage, and in that, given a plurality of groups, the line signals of the groups are selected in such a manner that they cover, group-wise, a plurality of horizontal, strip-shaped partial areas of the television image in a sequence provided by the latter. The advantage which is achieved by practicing the present invention is that all the information stored which relate to a specific partial area of the television image are arranged on the recording medium in a spatial assignment in respect of one another, which is equivalent to the spatial assignment of the corresponding image points of the television image. Except for a certain reduction of the image resolution, influence of the information belonging to such a partial area, among themselves, which could occur given a great recording density and, in particular, given a very small mutual interval of the longitudinal tracks, therefore have no negative effects.

According to a preferred embodiment of the invention, the recorded line signals are read in succession, group-wise, and are combined in a video signal, whereby all line signals respectively belonging to one and the same group are read in parallel and are reproduced serially after an intermediate storage.

A circuit arrangement for carrying out the method of the present invention is characterized in that a storage arrangement is provided with a plurality of line memories, designed as charge transfer devices, which memories are individually assigned to the individual lines comprised in a group. The charge transfer devices contain input stages which are alternately connectible with an input of the storage arrangement carrying the video signal. The outputs of the charge transfer devices are connected by way of amplifiers to writing heads which serve for recording electric signals on the recording medium. The charge transfer devices can be connected in parallel to read-out clock pulse voltage lines.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
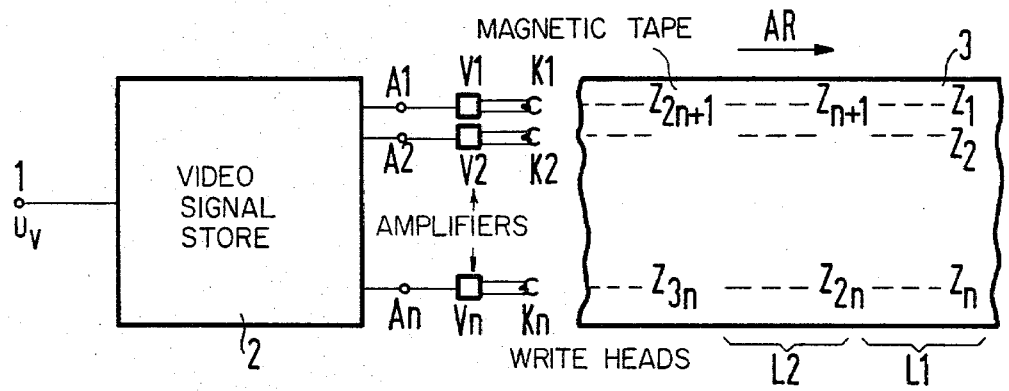
FIG. 1 is a schematic illustration of a circuit arrangement for recording a video signal in accordance with the teachings of the present invention.
Figure 2:
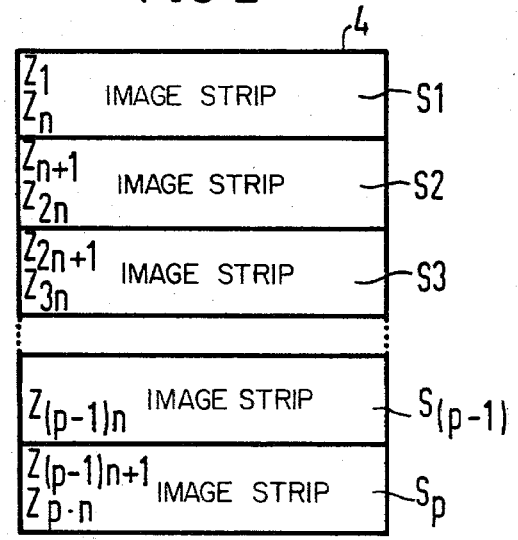
FIG. 2 illustrates the dissection of a television image into partial signal groups, according to the principles of the present invention.

Referring to FIG. 1, a video signal $u_v$ to be stored is supplied by way of an input 1 to a storage arrangement 2 which is provided with n outputs A1–An. A plurality of amplifiers V1–Vn are respectively connected to the outputs A1–An, which amplifiers are connected to respective electromagnetic writing heads K1–Kn so as to provide signals to be stored thereto. Then, n recording tracks, which extend parallel to one another, are assigned to the writing heads and extend in the longitudinal direction on a recording medium 3, for example in magnetic tape, which can be continuously moved in the direction of the arrow AR. When a television image 4 according to FIG. 2 is to be composed of, for example, p·n lines $Z_1$–$Z_{p \cdot n}$, whereby the brightness information of, for example, 420 image points are contained in each line, then the video signal $u_v$ consists of p·n successively occurring line signals having respectively 420 successively scannable amplitude values. According to the present invention, respectively n line signals are combined into a group and intermediately stored in the storage arrangement 2. Subsequently, the line signals are supplied by way of the outputs A1–An and the amplifiers V1–Vn to the writing heads K1–Kn, and are recorded parallel to one another in n longitudinal tracks. For the sake of greater clarity and simplicity, the longitudinal tracks of FIG. 1 are characterized by means of the line signals $Z_1$–$Z_n$ of the line signals recorded therein. It is readily apparent that all information of the television image 4 belonging to a first horizontal strip S1 are stored on a length L1 of the recording medium 3 as an information block consisting of n lines and 420 columns, whereby the recording density is very great given longitudinal tracks which lie closely adjacent one another.

An intermediate storage of the lines $Z_{n+1}-Z_{2n}$ of the line signals reproducing the second strip S2 and representing a second group in the storage arrangement 2, and its recording in the section L2 of the recording medium 3 occurs in the same manner. Since the further strips S3-Sp of the television image 4 and the strips of the following television images are also recorded in the same manner, a sequence of information blocks arises whose individual, stored information values respectively reside on the recording medium 3 in the same usual spatial assignment as the corresponding image points within the individual image strips S1-Sp.

Figure 3:
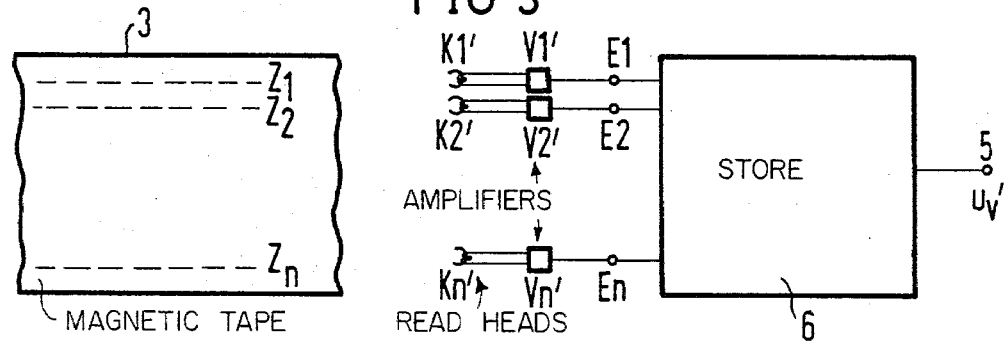
FIG. 3 is a schematic illustration of a circuit arrangement for reproducing a recorded video signal in accordance with the teachings of the present invention.

FIG. 3 illustrates reading of the information stored on the recording medium 3 and the compounding of the information into a video signal $u_v'$ occuring at an output 5, which corresponds to the signal $u_v$. To this end, the electromagnetic reading heads K1'-Kn' are provided which pick up the individual line signals of the group to be respectively read in parallel. The line signals are then supplied to individually assigned inputs E1-En of a further storage arrangement 6, are intermediately stored in the arrangement 6, and are then serially output, whereby the video signal $u_v'$ is formed at the circuit point 5 from the respectively successively occurring line signals of one and the same group and the successively occurring signals of the various groups.

Figure 4:
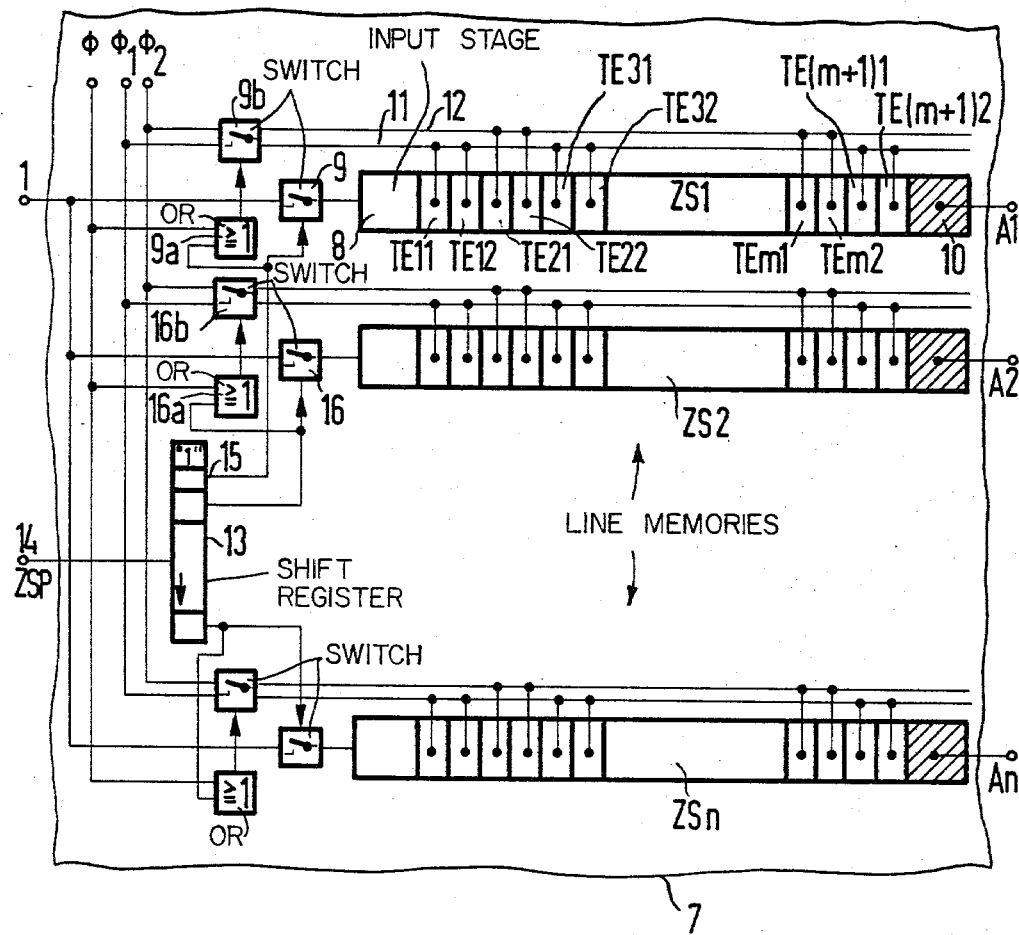
FIG. 4 is a schematic representation of an embodiment of a partial circuit of FIG. 1.

A preferred embodiment of the storage arrangement 2 is illustrated in FIG. 4. The storage arrangement comprises a plurality of line memories ZS1-ZSn which are respectively individually assigned to the n line signals of the group. In detail, the line signal describing the image line $Z_1$ is intermediately stored in the line memory ZS1, the line signal describing the image line $Z_2$ is intermediately stored in the line memory ZS2, etc. Assuming the construction of the line memories to be identical, the construction thereof will be based on that of the line memory ZS1. The line memory ZS1 comprises a charge coupled device (CCD), integrated on a semiconductor substrate 7. The semiconductor substrate 7, which is manufactured for example of p-conductive silicon, is covered by an electrically insulating layer of, for example, $SiO_2$. A series of electrodes TE11, TE12, TE21, TE22, ... TEm1, TEm2, TE(n+1)1 and TE(m+1)2 are arranged in close proximity and may advantageously consist, for example, of highly doped, polycrystalline silicon, or of aluminum, located on the insulating layer. An input stage 8 is connected to the first electrode TE11 and is connected to the circuit input 1 by way of a switch 9, whereas an output stage 10 is formed as an n-doped diffusion area and exhibits a terminal which is connected with the storage output A1.

The odd-numbered electrode pairs T11, T12; T31, T32; to which the pair TE(m+1)1, TE(m+1)2 are to be assigned, are connectible to a clock pulse voltage $\phi_1$ by way of a line 11 and a switch 9b; and the even-numbered electrode pairs TE21, TE22; TE41, TE42 ... to which the pair TEm1, TEm2 are assigned, are connectible to a clock pulse voltage $\phi_2$ by way of a line 12 and the switch 9b. The electrically insulating layer covering the semiconductor substrate 7 is formed with a greater thickness between the electrodes TE11, TE21, TE31, etc than beneath the electrodes TE12, TE22, TE32, etc. When a clock pulse $\phi_1$ occurs on the line 11, then local maximums of the surface potential of the semiconductor substrate 7, which are designated as potential wells, are located beneath the electrode TE12, TE32, etc, whereas smaller values of the surface potential are present beneath the electrodes TE11, TE31, etc. because of the thicker electrically insulating layer. When, during the occurrence of a clock pulse $\phi_1$ on the line 11 from the input stage 8, given the applied video signal $u_v$, a plurality of minority charge carriers, i.e. electrons in the case of a p-conductive substrate 7, are injected into the substrate, and then are collected in the area of the first maximum of the surface potential, i.e. under the electrode TE12. Upon occurrence of the next clock pulse $\phi_2$ on the line 12, and after termination of the clock pulse $\phi_1$, local maximums of the surface potential are then located beneath the electrodes TE22, TE42, etc., including the electrode TEm2, whereby the charge carriers previously located beneath the electrode TE12, which one also designates as a charge package, are displaced into the surface-side substrate area lying beneath the electrode TE22. At the next clock pulse $\phi_1$, this charge package is then shifted into the area beneath the electrode TE32, whereas a further charge package injected by the input stage 8 arrives in the potential well beneath the electrode TE12.

During the occurrence of a line signal to be stored in the memory ZS1, the switches 9 and 9b are in such a switching position that they connect the input stage 8 with the input 1, the line 11 with the pulse $\phi_1$ and the line 12 with the pulse $\phi_2$. To this end, a shift register 13 is provided in which only a logic "1" is displaced in the clock pulse of the line synchronization pulses ZST of the video signal $u_v$ occurring at the input 14 in the direction of the arrow from the top to the bottom, whereas the stages not occupied at the moment with the logic "1" respectively exhibit a logic "0". In the initial state, the logic information "1" is situated in the uppermost stage of the shift register 13. Upon the occurrence of the line synchronization pulse ZSP which is assigned to the line signal describing the first line $Z_1$, the logic "1" is shifted into the next stage below, whose output 15 is then conductive and causes operation of the switches 9 and 9b into the aforementioned switch positions. Thereby, the output 15 influences the control input of the switch 9b by way of an OR gate 9a.

By means of the function of the input stage A, which will be set forth below, individual charge packages whose magnitudes are proportional to the equidistant momentary values of the amplitude of the video signal $u_v$ are then respectively received in the clock pulse $\phi_1$. These charge packages are then displayed step-by-step respectively four electrode intervals in the direction of the output stage 10, which is continued until the scanning values of the line signal assigned to the image points of the first line $Z_1$ are stored beneath the electrode Tm2-TE12 by means of a corresponding plurality of charge packages. Given m=420, therefore, 420 scanning values are written into the line memory ZS1.

With the occurrence of the next line synchronization pulse ZSP, the switches 16 and 16b are actuated, the latter by way of an OR gate 16a, by way of the next stage of the shift register 13, whereas at this time the switches 9 and 9b are blocked so that a corresponding storage of the scanning values of the following line signal occurs into the second line memory ZS2. During this reading-in process, only the electrodes of the line memory are charged in the manner already described with the clock pulses $\phi_1$ and $\phi_2$. The electrodes of the remaining line memories are connected to a potential which corresponds to the amplitude of a clock pulse, namely that of the clock pulse $\phi_1$ or, respectively, the clock pulse $\phi_2$, by way of the switches, for example 9b, in the condition illustrated. Insofar as all line memories ZS1–ZSn which are occupied with the line signals assigned thereto, they are simultaneously charged with the clock pulses $\phi_2$ and $\phi_2$, which occurs by means of the feed of a read-out pulse $\phi$ to all of the OR gates 9a, 16a, etc, which brings all of the switches 9b, 16b etc into the corresponding switch positions. Thereby, upon occurrence of the first clock pulse $\phi_1$, the charge packages present beneath the electrode TEm2 in all line memories are first supplied to the diffusion areas, in the case of the memory ZS1, therefore, to the area 10, and change the potential of these areas which was previously brought to a reference potential and subsequently freed of all external potentials, so that voltage signals simultaneously occur at the output A1–An which correspond to the scanning values of the video signal belonging to the first column and to the lines 1–n of the television image. These voltage signals are then amplified in the amplifiers V1–Vn and are recorded simultaneously, and in parallel, in n longitudinal tracks of the recording medium by means of the writing heads K1–Kn (FIG. 1). Subsequently, the scanning values of the video signal belonging to the next columns are read and recorded as voltage values in the same manner.

The input stages 8, which serve for the periodic injection of charge carriers into the line memories, are known per se in various embodiments and are described, for example, in the book by Sequin and Tompsett, "Charge Transfer Devices", Academic Press Inc., New York, 1975, pp. 48–50, particularly FIG. 3.12 (C) and (D) and Page 50, lines 7–30. The output stages 10, for example, are likewise well known in the art and are described, for example, in the same text on Pages 52–54 and, particularly, on the basis of FIG. 3.14.

Figure 5:
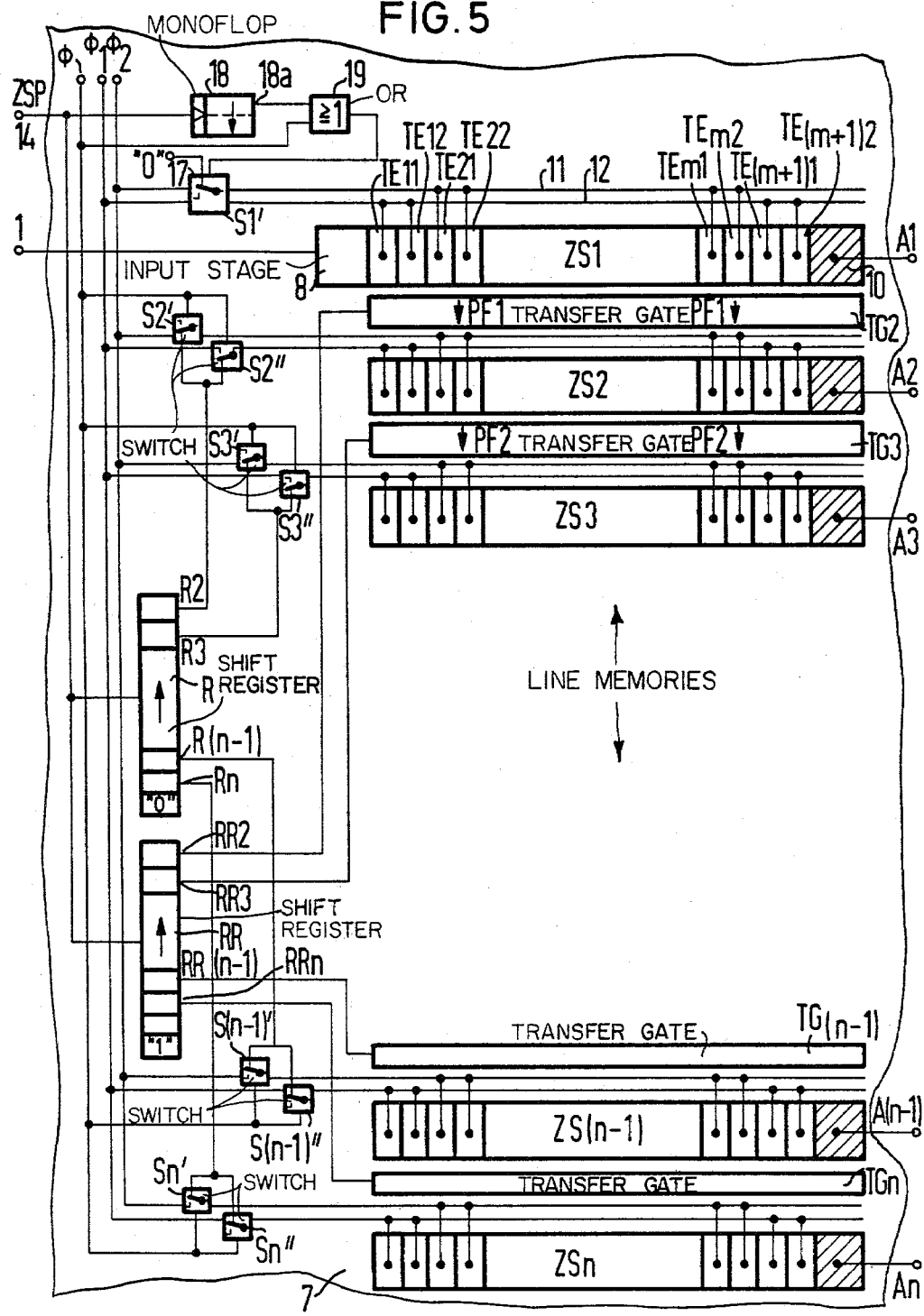
FIG. 5 is a schematic representation of another embodiment of a partial circuit of FIG. 1.

FIG. 5 illustrates another preferred embodiment of the storage arrangement 2 represented in FIG. 1. The line memory ZS1 is constructed in the same manner as in the arrangement according to FIG. 4, whereas the line memories ZS2–ZSn are designed without input stages. After a scanning of individual amplitude values occurring by means of the input stage A, all line signals are successively read into the memory ZS1. All electrodes of the individual line memories are connected in parallel with one another to the outputs R2–Rn of the individual stages of a shift register R by way of switches S2', S2" ... Sn', Sn" situated in the idle state. The electrodes of the memory ZS1 are connected in parallel with one another to a connection 17 which has a logic "0" applied thereto, via a switch S1' which is situated in the idle state.

After the occurrence of a line synchronization pulse ZSP, which is assigned to the first line $Z_1$, at the terminal 14, a monoflop 18 is flipped out of its stable condition and brought into its unstable condition in which the output 18a is conductive. Therewith, the control input of the switch S1' is supplied by way of the output of an OR gate 19 with a voltage which operates the switch S1' into a switching position in which it occupies the lines 11 and 12 with the respective clock pulses $\phi_1$ and $\phi_2$. The scanning values of the first line signal are written into the memory ZS1 under the influence of the clock pulses $\phi_1$ and $\phi_2$. At the same time as this write-in process occurs, a logic "0" is fed step-by-step from the shift register R in the direction of the arrow, the shift register R being triggered by the synchronization process ZSP, whereby the respective stages not occupied by a logic "0" exhibit a logic "1". In this manner, the outputs Rn–R2 become briefly dead in succession, whereby the electrodes of the individual line memories ZSn–ZS2 also become briefly dead in succession. After traversing the entire shift register R, the logic "0" is then again shifted into the lowest stage.

After the complete inscription of the first line signal into the memory ZS1, and after the shift of the logic "0" into the lowest stage of the shift register R, the monoflop 18 again switches into its stable condition. Thereby, the control input of the switch S1' becomes dead and the switch S1' again assumes the illustrated switching position in which all of the electrodes of the memory ZS1 have a logic "0" applied thereto by way of the switch 17. Thereby, such a potential change occurs beneath the electrodes TE22, TE42 ... TEm2, so that the charge packages stored beneath these electrodes are displaced in parallel and simultaneously in the direction of the arrows PF1 into the semiconductor area beneath the corresponding electrodes of the line memory ZS2. After the occurrence of the next line synchronization pulse ZSP, both the read-in of the second line signal into the memory ZS1 and a new traversal of the logic "0" in the shift register R begins, whereby the logic "0", upon attainment of the output R2, displaces the charge packages, already once shifted, from the memory ZS2 to the memory ZS3 (according to the arrows PF2). The subsequent flip of the monoflop 18 then effects a shift of the charge packages representing the scanning values of the second line signal from the memory ZS1 toward the memory ZS2. After the sequence of n write-in processes and the shift processes sequencing parallel thereto and controlled by way of the shift register R, n line signals are then written into the individual line memories, whereby the line signal describing the line $Z_1$ is contained in the memory ZSn and the line signal describing the line $Z_n$ is contained in the memory ZS1. By means of a simultaneous drive of the electrodes of the line memories ZS1–ZSn with the clock pulses $\phi_1$ and $\phi_2$, which is effected by feeding a read-out pulse $\phi$ to the lower input of the OR gate 19, as well as to the switches S2', S2" ... Sn', Sn", all of the stored line signals are again read simultaneously and in parallel at the outputs A1–An.

In order to reduce the mutual interference which can occur upon shifting the charge packages in accordance with the arrows PF1, PF2, etc. in that parts of the charge packages run counter to the arrow directions, transfer gates TG2–TGn can be provided between the electrode rows of the line memories, as illustrated in FIG. 5 and in accordance with the preferred further development of the invention. The transfer gates comprise metal electrodes or strongly doped, polycrystalline silicon, and are located on the electrically insulating layer which covers the substrate 7. The transfer gates are respectively connected with the outputs RR2, RR3 ... RRn of a further shift register RR, in which a logic "1" passes through in the direction of the arrow. Such a traversal is respectively occassioned upon the supply of a line synchronization pulse ZSP. The stages of the shift register RR which are not occupied with the logic "1" exhibit a logic "0". The traversal of the logic "1" in the shift register RR is adapted to the traversal of the logic "0" in the shift register R in such a manner that respectively only that transfer gate, for example, the transfer gate TGn, has a voltage applied thereto which lies in the direction of the arrows PF1, PF2, etc., next to an adjacent row, for example, of a line memory ZS (n−1), which has just been switched free of an output voltage of the shift register R. This is achieved by the insertion of an additional stage between the lowest stage of the shift register RR and the stage having the output RRn. Given the same clock pulse frequency of the shift registers R and RR, the output RR2 is only occupied with the logic "1" when the logic "0" is again shifted into the illustrated position, i.e. at that time in which the electrodes of the memory ZS1 are occupied with a logic "0" by way of the switch S1'.

Figure 6:
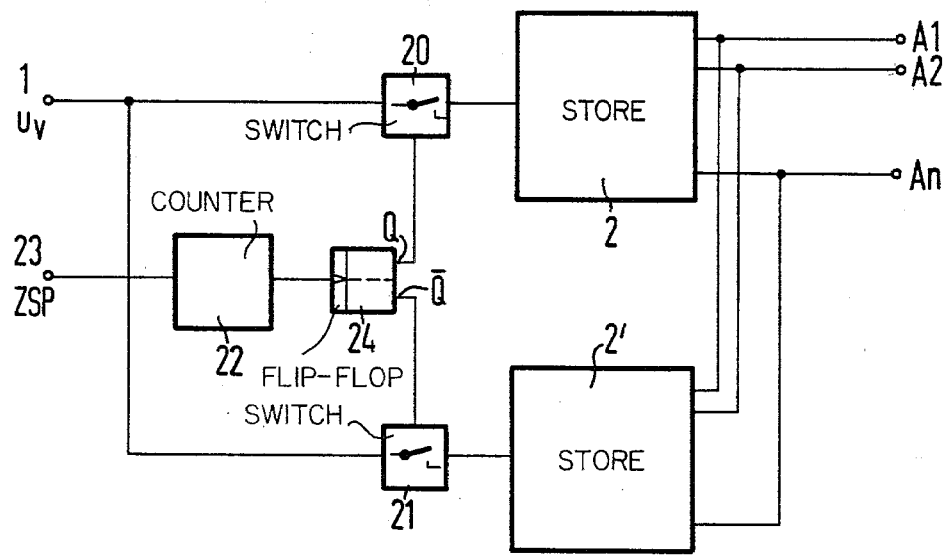
FIG. 6 is a schematic illustration of a further development of the circuit arrangement of FIG. 1.

When the line signals of the television image are combined to a number of groups, as indicated by means of the strips S1–Sp in FIG. 2, then a further development of the method of the invention can be advantageously employed, which is explained on the basis of the circuit arrangement illustrated in FIG. 6. In FIG. 6, circuit parts which have already been described on the basis of FIGS. 1 and 3 are provided with the same reference characters. FIG. 6 differs with respect to the circuit of FIG. 1 in that, in addition to the storage arrangement 2, a second, similarly designed storage arrangement 2' is provided whose outputs are connected in parallel to the corresponding outputs A1–An of the storage arrangement 2. The storage arrangements are connected with the circuit input 1 by way of the switches 20 and 21, respectively. Further, a counter 22 is provided which is charged by way of a counter input 23 with the line synchronization pulses ZSP and has a counter capacity which corresponds to the number of lines n belonging to a group. The counter output is connected with the clock input of the flip-flop 24 whose outputs Q and $\overline{Q}$ are connected to control respective ones of the switches 20 and 21. If one assumes that at the beginning of a recording of a video signal $u_v$ the output Q is conductive, and the output $\overline{Q}$ is, on the other hand, not conductive, then the switch 20 is brought into a switching position in which the storage element 2 is connected with the input 1. Thereby, the first n line signals are read into the storage arrangement 2 in the manner described. After the arrival of n+1 line synchronization pulses ZSP, an overflow pulse is emitted from the counter 22 to the flip-flop 24 to switch the latter into a condition in which the output $\overline{Q}$ becomes conductive and the output Q is not conductive. This causes a closing of the switch 21 and an opening of the switch 20. In this position of the flip-flop 24, therefore, the line signals describing the lines $Z_{m+1}-Z_{2n}$ are read into the storage arrangement 2', whereas at the same time the information stored in the storage arrangement 2 are read out in parallel by way of the outputs A1–An. After the occurrence of 2n+1 line synchronization pulses ZSP, the counter 22 emits a further overflow pulse which returns the flip-flop 24 into its original condition, so that the line signals describing the lines $Z_{2n+1}-Z_{3n}$ are read into the storage arrangement 2, whereas the signals previously stored in the storage arrangement 2' are, in turn, read out by way of the outputs A1–An. In this further development of the invention, reading from one storage arrangement, for example from the storage arrangement 2, can occur in the time span which is required for writing in the following group of line signals into the other storage arrangement, for example into the storage arrangement 2'.

Figure 7:
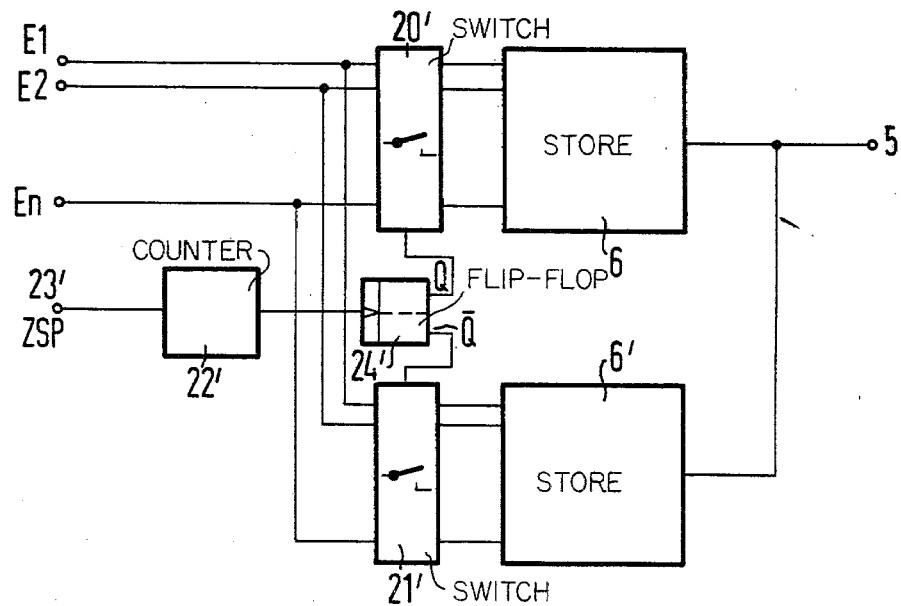
FIG. 7 is a schematic illustration of a further development of the circuit arrangement of FIG. 3.

FIG. 7 illustrates a circuit arrangement for the reproduction of the recorded video signal $u_v$ in which the reading of a group of line signals from the further storage arrangement 6 occurs in a time span during which the next successive group of line signals are stored in a similar further storage arrangement 6'. To this end, the inputs of the further storage arrangement 6' are connected in parallel to the inputs E1–En of the storage arrangement 6 by way of respective switches 20' and 21' which are additionally provided in the memory feed lines. The outputs of the storage arrangements 6 and 6' are connected to a common memory output 5. The drive of the switches 20' and 21' occurs in the manner described on the basis of FIG. 6, via a counter 22' and a flip-flop 24' which are operated by means of the line synchronization pulses ZSP applied to the counter input 23'.

The further storage arrangement 6 or, respectively, 6' required in the reproduction of the stored video signal $u_v$ can be largely constructed in accordance with FIG. 4 or FIG. 5. In order to adapt the storage arrangement according to FIG. 4 to this purpose, it is necessary to define the connections A1–An as inputs of the further storage arrangement and to employ the connection 1 as the output 5 of the further storage arrangement. Thereby, the stages 10 are to be interpreted as input stages, while the stages 8 serve as output stages. The clock pulses $\phi_1$ and $\phi_2$ are first connected by way of all switches 9b, 16b, etc, in order to occasion a simultaneous read-in of the n line signals recorded next to one another into the line memories ZS1–ZSn. Only after that does the logic "1" circulate in the shift register 13 in the direction of the arrow and effect the reading of the individual line memories in succession. The shift of the charge packages in the line memories, thereby, does not occur in previously-described direction from left toward right, but rather from right toward left, whereby the respective electrodes TE12, TE22, TE32, etc. of the line memories are arranged on thicker electrically insulating layers than are the electrodes TE11, TE21, TE31, etc.

When the storage arrangement 2 is constructed according to FIG. 5, then the further storage arrangement 6 or, respectively, 6' should be advantageously constructed according to the same principle, whereby, proceeding from FIG. 5, the following adaptations are to be undertaken. The connections A1–An represent the inputs of the further storage arrangement, whereby the areas 10 become input stages. After the parallel reading-in of all line signals by the clock pulses $\phi_1$ and $\phi_2$, which are supplied by way of the switches S1' and S2', S2" through Sn', Sn", a reading of the stored information occurs in such a manner that the line memory ZSn is repeatedly read out. To this end, an output area not illustrated in FIG. 5 is provided at the left end of the electrode row of the memory ZSn, which output area is connected with the memory output 5. Thereby, the area 8 and the connection 1 of FIG. 5 has not significance. After each readout process, with reference to the line memory ZSn, a passage of the logic signals "0" and "1" through the shift registers R and RR occurs in the illustrated arrow direction, whereby a further information line is respectively shifted under the electrode row of the memory ZSn and supplied to a serial readout. Here, also, the thinner and thicker parts of the electrically insulating layer are respectively changed in the assignment to the electrodes, as already mentioned in the preceding paragraph. The switches Sn' and Sn" are driven as the switch S1' in FIG. 5 and the switch S1' is driven by way of a further stage of the shift register R subsequently connected to the shift register stage R2.

Other integrated charge transfer devices (CTD) can also be employed instead of the embodiment of the line memories contained in the storage arrangements 2 and 6 or, respectively, 2' and 6' described in FIGS. 4 and 5. Therefore, for example, bucket brigade devices (BBD) well known in the art per se can be employed as well as BCCD arrangements in which a charge transport does not occur on the surface, but rather in the interior of the substrate. Such devices, for example, are treated in the book by Sequin and Tompsett, "Charge Transfer Devices", Academic Press, Inc., New York 1975, pp. 1–18. Moreover, in addition to the two-phase arrangement described above, arrangements having three, four or more phases, known per se, can be employed, as the same are described, for example, in the same publication on Pages 19–30.

Figure 8:
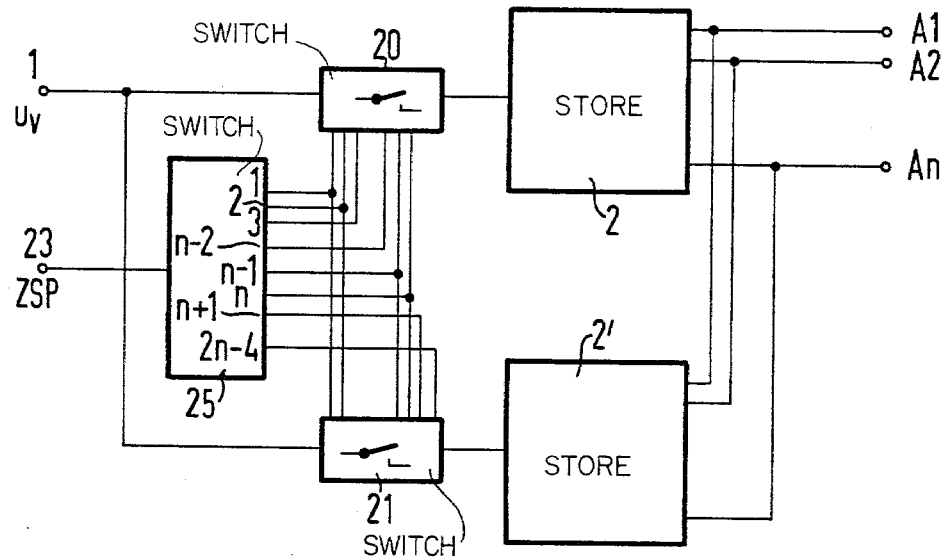
FIG. 8 is a schematic illustration of another further development of the circuit arrangement of FIG. 1.

FIG. 8 illustrates a further development of the circuit of FIG. 1. Here, as in FIG. 6, two storage arrangements 2 and 2' are provided, whereby a group of line signals is respectively read into the one storage arrangement, for example the storage arrangement 2', while the previously read-in group of line signals is read from the other storage arrangement, for example the storage arrangement 2. The switches 20 and 21 also correspond to those of FIG. 6. Only the drive is changed insofar as the counter 25 is provided whose outputs 1, 2, (n−1) and m are connected with the control inputs of both switches 20 and 21, whereas the outputs 3—(m−2) are connected exclusively to the control inputs of the switches 20 and the outputs (m+1)-(2m−4) are connected only to the control inputs of the switch 21. The input of the switch 25 is applied to the circuit point 23 for receiving the line synchronization pulses ZSP of the video signal $u_v$. During the arrival of the first 2n−4 line synchronization pulses, the counter outputs 1-(2n−4) are successively conductive, whereby the one, the other or both switches 20, 21 are actuated by way of each output in such a manner that they conductively connect the input of the assigned storage arrangement with the input 1 for the respective duration of a line signal. Upon the occurrence of the next (2n−4) line synchronization pulses, a new marker sequence will then traverse the counter outputs, which continues periodically. Therefore, beginning with the group of line signals representing the third strip S3, there occur such a distribution of individual line signals to the storage arrangements 2 and 2' that the first two respective line signals of the groups stored in one of these arrangements, for example in the storage arrangement 2, is identical with the last two line signals of the preceding groups stored in the other storage arrangement, for example in the storage arrangement 2', whereas, on the other hand, the last two line signals of the groups stored in the arrangement under consideration, for example in the storage arrangement 2', are identical with the first two line signals at the next successive group stored in the other storage arrangement, for example the storage arrangement 2. Therefore, the information blocks stored in the storage arrangements 2 and 2' respectively overlap by two lines. If, for example, one also connects the counter outputs 3 and (n−2) to the control inputs of both of the switches 20 and 21 and provides the output (2n−5) as the last counter output, then the mutual overlapping can be expanded to three lines, etc.

Figure 9:
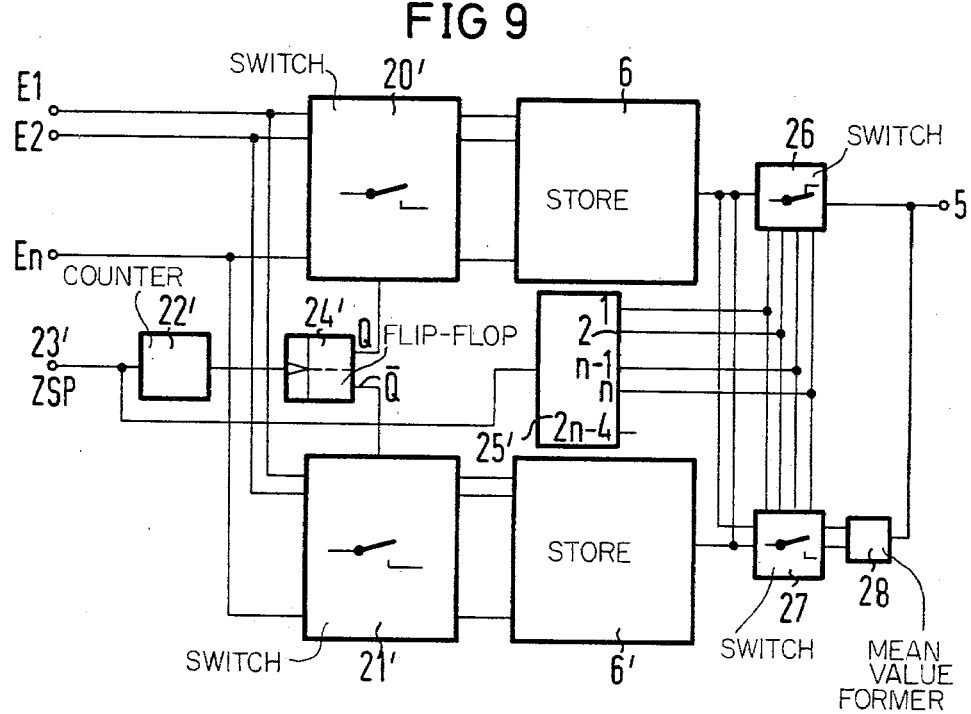
FIG. 9 is a schematic illustration of another further development of the circuit arrangement of FIG. 3.

FIG. 9 illustrates a circuit which is suitable for the reproduction of a video signal recorded with an arrangement according to FIG. 8. The elements 6, 6' and 20' through 24' correspond in construction and manner of operation to the same components provided with the same reference characters in FIG. 7. As in FIG. 7, the information blocks recorded in succession also arrive in FIG. 9 in alternation in the further storage arrangements 6 and 6' upon being read out. On the one hand, the outputs of the storage arrangements 6 and 6' are connected in parallel to one another and are fed by way of a switch 26 to a common memory output 5, and, on the other hand, each is individually applied by way of a two-pole switch 27 to the two inputs of the circuit 28 which is a mean value former, whose output is connected to the memory output 5. A counter 25', which corresponds to the counter 25 of FIG. 8 in construction and manner of operation, is provided for driving the switches 26 and 27. Thereby, however, only the outputs 1, 2, (n−1) and n fed to both switches 20 and 21 in FIG. 8 are connected to the control inputs of both switches 26 and 27, whereas the remaining counter outputs remain unconnected. The input of the counter 25' is connected to the terminal 23' to receive the line synchronization pulses ZSP. When line signals are read which are only stored in one of the storage arrangements 6, 6', then the switches 26 and 27 are not charged with the control voltages and remain in their idle positions illustrated, whereby the switch 26 connects both memory outputs through to the common memory output 5, whereas the switch 27 separates these memory outputs from the circuit 28. The readout phases of the storage arrangements 6 and 6' are adapted to one another in such a manner that, at the same time as the read-out of the next-to-last line memory of the one storage arrangement, for example the storage arrangement 6, the read-out of the first line memory of the other storage arrangement occurs. Upon occurrence of the line signals simultaneously stored in the two arrangements 6 and 6', i.e. upon occurrence of an output voltage at the counter outputs 1, 2, (n−1), or n, the switches 26 and 27 are actuated, whereby the switch 26 separates the counter outputs connected in parallel to one another from the output 5 and the switch 27 connects the counter outputs fed next to one another to the mean value former 28. Thereby, the respective line signals separately stored and describing the same line of the television image are combined to form a single line signal whose amplitude corresponds to the mean values of the two line signals separately stored. In this manner, interferences which occur under certain conditions by means of the locally separate recording of the image information present at the boundaries of the individual strips S1–Sp (FIG. 2) are largely suppressed.

Figure 10:
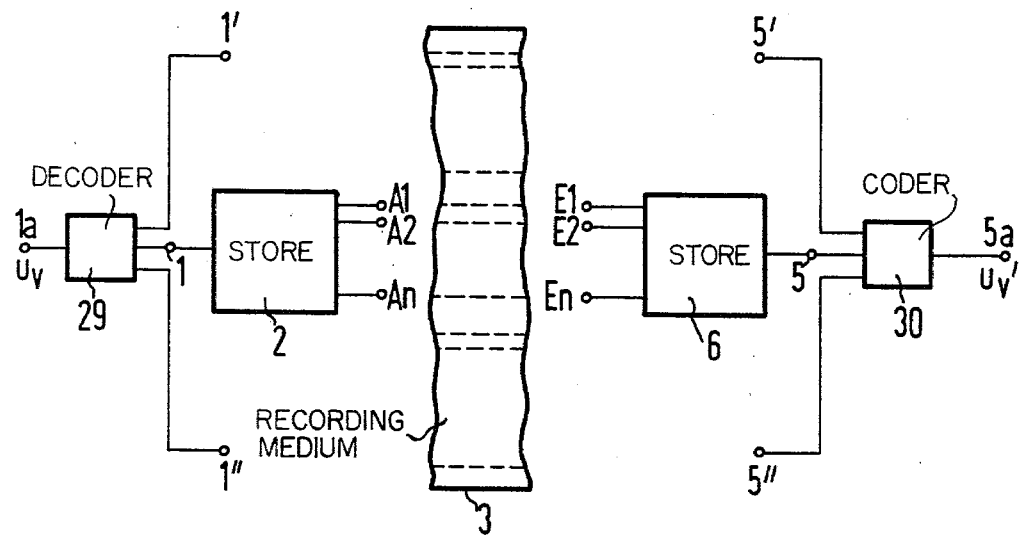
FIG. 10 is another schematic illustration of a further development of the circuit arrangements illustrated in FIGS. 1 and 3.

Whereas the techniques described up to this point from the basis of FIGS. 1–9 serve for recording and reproducing the video signals $u_v$ of the black and white content, and expansion of such techniques for the purpose of recording and reproducing video signals of color content will be explained on the basis of FIG. 10. The circuit arrangement according to FIG. 10 is different from that of FIGS. 1 and 3, first in that a decoder 29, known per se, is connected ahead of the input 1, which decoder splits the video signal $u_v$ of the color content arising at the circuit input 1a into a luminance signal which is applied to the input 1 and two appertaining color differential signals which are respectively supplied to the circuit points 1' and 1". The circuit design according to FIGS. 1 and 3, or according to FIGS. 6 and 7, or, respectively, FIGS. 8 and 9, which serves for the recording and reproduction of the luminance signal is located between the separate input 1 and the circuit output 5 of FIG. 10. The circuit points lying between these memory outputs A1–An and the memory inputs E1–En are not illustrated in FIG. 10 for reasons of clarity, the recording medium being simply indicated at 3. In FIG. 10, further circuits which correspond to those between the input 1 and the output 5 according to the basic construction are provided between the other inputs 1′, 1″ and the other outputs 5′, 5″. These circuits serve for recording and reproducing the color differential signals supplied at 1′ and 1″. As can be seen from FIG. 10, the number of longitudinal tracks on the recording medium 3 must thereby be increased to such a degree that the line signals required for the color differential signals can also be recorded in parallel adjacent thereto at the same time as the line signals transmitted by way of the outputs A1–An. Accordingly, the width of the recording medium 3 must be increased, or the number n must be reduced, with respect to the techniques for recording video signals of black and white content, to such a degree that, without increasing the width of the recording medium, the available longitudinal tracks can be divided for storing the line signals for the luminance signal and for the color differential signals. The signals occurring at the points 5, 5′ and 5″ are then recombined in a coder 30 to form a video signal $u_v'$ having a color content which can be tapped at the circuit output 5a.

According to a variation of the last-mentioned method, the dissection of the video signal in the decoder 29 can also occur in three color signals which are then respectively available at the points 1, 1′ and 1″. In this case, also, the color signals occurring at the circuit points 5, 5′ and 5″ are recombined in the coder 30 to form the video signal $u_v'$.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method of recording onto and reading video signals from a continuously moving recording medium, comprising the steps of:
   combining television image line signals into at least one group;
   intermediately storing all line signals of a group;
   recording all of the stored line signals of a group simultaneously on respective parallel tracks of the recording medium;
   given a plurality of line signal groups, selecting the line signals of the groups such that each group covers a horizontal strip-shaped area of the television image;
   reading the recorded line signals in succession, group-wise, by reading the line signals of each group in parallel;
   intermediately storing the read line signals;
   reading the stored line signals in series;
   combining the read line signals into a video signal; and
   wherein, during recording and reproduction, the step of intermediately storing is further defined as intermediately storing a group of line signals while the preceding group of line signals is being recorded and reproduced, respectively.

2. The method of claim 1, the line signals being color video line signals and further comprising the steps of:
   decoding the line signals into three signal components; and
   performing all of the steps of claim 1 for each of the three signal components.

3. The method of claim 2, wherein the step of decoding is further defined as:
   decoding the color video line signals into three separate color signals as said three signal components.

4. The method of claim 2, wherein the step of decoding is further defined as:
   decoding the color video line signals into a luminance signal and two color difference signals as said three signal components.

5. A method of recording onto and reading video signals from a continuously moving recording medium, comprising the steps of:
   combining television image line signals into at least one group;
   intermediately storing all line signals of a group;
   recording all of the stored line signals of a group simultaneously on respective parallel tracks of the recording medium;
   given a plurality of line signal groups, selecting the line signals of the groups such that each group covers a horizontal strip-shaped area of the television image;
   reading the recorded line signals in succession, group-wise, by reading the line signals of each group in parallel;
   intermediately storing the read line signals;
   reading the stored line signals in series;
   combining the read line signals into a video signal;
   wherein the step of reading the recorded line values is further defined as
      periodically scanning the recorded line signals of a group to produce scan values, and
      reading simultaneously the recorded scan values of all line signals of a group belonging to the same column of a television image; and
   wherein the step of intermediately storing the read line signals and reading the stored line signals are further defined as
      storing the scan values in parallel in respective line memories assigned thereto, and
      reading the parallel stored scan values of a group in series in sequence of the television image.

6. A method of recording onto and reading video signals from a continuously moving recording medium, comprising the steps of:
   combining television image line signals into at least one group;
   intermediately storing all line signals of a group;
   recording all of the stored line signal of a group simultaneously on respective parallel tracks of the recording medium;
   given a plurality of line signal groups, selecting the line signals of the groups such that each group covers a horizontal strip-shaped area of the television image;
   periodically scanning the line signals of a group to obtain scan values;
   and wherein the steps of intermediately storing and recording are further defined as storing the scanning values in succession in respective line memories, and simultaneously reading and recording the stored scan values of line signals of the same column of the television image.

7. The method of claim 6, wherein the line signals are selected such that predetermined last line signals of one group are the same as predetermined first line signals of the next group.

8. A video recorder for recording video signals on a constantly moving recording medium, comprising:

a video signal input including means for receiving and dividing line signals into groups with each group covering a horizontal strip-shaped area of a television image;

a storage arrangement including a plurality of charge transfer devices, each of said charge transfer devices assigned to a line signal of a group and including an input for sequential connection to said video signal input, and an output, said charge transfer devices operable to store the line signals and step the same towards said outputs;

a plurality of amplifiers connected to respective outputs of said charge transfer devices;

a plurality of writing heads connected to and driven by said amplifiers to simultaneously record the line signals of a group on parallel tracks of the recording medium;

a plurality of first switch means connected between said video signal input and said inputs of said charge transfer devices and operable to sequentially connect said inputs of said charge transfer devices to said video input;

a line synchronization pulse input for receiving line sync pulses;

a shift register including an input connected to said line synchronization input, and a plurality of outputs connected to respective first switch means and operable to sequentially close said first switch means in response to the line sync pulses;

first and second clock inputs for receiving first and second clock pulses, respectively, for operating said charge transfer devices;

a read-out pulse input for receiving read-out pulses; and a plurality of second switch means connected between said first and second clock pulse inputs and said charge transfer devices, each of said second switch means connected to said read-out pulse input and a respective output of said shift register and controlled thereby to connect said clock pulses to said charge transfer devices in the same sequence as the connection of said inputs of said charge transfer devices to said video signal input.

9. A video recorder for recording on and reproducing from a constantly moving recording medium, comprising:

a plurality of recording heads and a plurality of reading heads disposed to be adjacent the recording medium;

a video input terminal;

first memory means including video input means connected to said video input terminal and operable to sample a video signal to provide a line signal for each line of the television image, said television image having a plurality of groups of line signals with each group covering a strip-shaped area of the television image, and a plurality of first line signal memories connected to said video input means to receive the line signal samples of a group in series and each group in series operable to output the line signal samples of each group in parallel group-by-group;

a plurality of recording amplifiers connected between said first memory means and said recording heads and operable in response to a group of line signal samples of a group to record the same simultaneously in parallel tracks of the recording medium;

a plurality of reading amplifiers connected to said reading heads and operable to reproduce each group of recorded line signal samples, group-by-group, in parallel;

second memory means including a plurality of second line signal memories connected to said reading amplifiers for receiving and storing, group-by-group, the reproduced line signal samples, and video output means connected to said second line signal memories and operable to output the reproduced line signal samples in series and reconstruct the video signal;

a video output terminal connected to said video output means;

third memory means comprising additional video input means and a plurality of third line memories connected to said recording amplifiers;

first and second switch means connected between said video input terminal and said video input means of said first and third memory means, respectively; and clocked counter means including 2n−m sequentially energized outputs, where n is equal to the number of lines in a group and m is twice the number of lines overlapping from one group to the next, the first n−m/2 outputs connected to said first switch means, the n+1−m/2 to 2n−m outputs connected to said second switch means, and the n−m/2 to n+m/2 outputs connected to both said first and second switch means, whereby said first switch means is operable to a closed switch condition in response to the first through n+m/2 counts and said second means is operated to a closed condition in response to the n−m/2 through 2n−m counts of said clocked counter means.

10. A video recorder for recording on and reproducing from a constantly moving recording medium, comprising:

a plurality of recording heads and a plurality of reading heads disposed to be adjacent the recording medium;

a video input terminal;

first memory means including video input means connected to said video input terminal and operable to sample a video signal to produce a line signal for each line of a television image, said television image having a plurality of groups of line signals with each group covering a strip-shaped area of the television image, and a plurality of first line signal memories connected to said video input means to receive the line signal samples of a group in series and each group in series operable to output the line signal samples of each group in parallel group-by-group;

a plurality of recording amplifiers connected between said first memory means and said recording heads and operable in response to a group of line signal samples of a group to record the same simultaneously in parallel tracks of the recording medium;

a plurality of reading amplifiers connected to said reading heads and operable to reproduce each group of recorded line signal samples, group-by-group, in parallel;

second memory means including a plurality of second line signal memories connected to said reading amplifiers for receiving and storing, group-by-group, the reproduced line signal samples, and video output means connected to said second line signal memories and operable to output the reproduced line signal samples in series and reconstruct the video signal;

third memory means including video input means connected to said video input terminal and operable a video signal to provide a line signal for each line of a television image in the same manner as said first memory means, and a plurality of third line signal memories connected to said video input means to receive the line signal samples of a group in series and each group in series operable to output the line signal samples of each group in parallel group-by-group;

fourth memory means including an additional video output means and a plurality of fourth line signal memories connected to said reading amplifiers for receiving and storing, group-by-group, the reproduced line signal samples, said additional video output means connected to said fourth line memories and operable to output the reproduced line signal samples in series and reconstruct the video signal;

a video output terminal connected to said video output means of said second and fourth memory means;

first and second switch means connected between said reading amplifiers and said line memories of said first and third memory means, respectively;

memory control means connected to said first clocked counter means and to said first and second switch means and responsive to a transfer signal to operate said first and second switch means to opposite switch conditions;

normally closed third switch means connected between said video output means of said second and fourth memory means and said video output terminal;

normally open fourth switch means connected to receive the signals of overlapping lines of adjacent groups in said second and fourth memory means;

second clock counter means including $2n-m$ sequentially energized outputs, where n is the number of lines in a group and m is twice the number of overlapping lines from one group to the next, the first through m outputs connected to both said third and fourth switch means and the $n-m/2$ to n outputs connected to both said third and fourth switch means, whereby said third switch means is opened in response to the first through $m/2$ counts and in response to the $n-m/2$ through m counts and said fourth switch means is closed in response to the first through $m/2$ and $n-m/2$ through n counts of said second clocked counter means; and a mean value former connected between said fourth switch means and said video output terminal for forming the mean values of corresponding lines of adjacent groups.

11. A method of recording and reproducing video signals onto and from, respectively, a constantly moving recording tape, comprising the steps of:

dividing television image line signals into a plurality of groups, each of said groups covering a horizontal strip-shaped area of the television image and in which the line signals are selected such that predetermined last lines of a group are equal to the same predetermined first lines of the adjacent group;

intermediately storing the line signals of each of said groups;

recording the stored line signals of a group simultaneously on the recording tape, group-by-group;

reading the recorded line signals from the recording tape each line in parallel with each of said groups read in series;

intermediately storing the simultaneously recorded read line signals of all lines in respective line memories, group-by-group;

reading the stored line signals from the line memories with the lines of each group read in series and the reading of the groups being temporally adapted so that the predetermined last and first lines of adjacent groups are simultaneously output; and forming the mean value for corresponding ones of said predetermined last and first lines of adjacent groups.

12. A video recorder for recording video signals on a constantly moving recording medium, comprising:

a video signal input including means for receiving and dividing line signals into groups with each group covering a respective horizontal strip-shaped area of a television image;

a storage arrangement comprising a plurality of charge transfer devices, each of said charge transfer devices including an output and operable to shift information toward said output, a first of said charge transfer devices including an input which is connected to said video signal input, and means for controlling parallel signal transfer from charge transfer device-to-charge transfer device;

a plurality of amplifiers each connected to a respective charge transfer device output; and a plurality of writing heads each connected to a respective amplifier for simultaneously writing the transfer information in parallel tracks of said medium.

* * * * *